United States Patent [19]

Toyoda

[11] 4,425,816
[45] Jan. 17, 1984

[54] STRUCTURE FOR SECURING A CYLINDER DRIVE GEAR TO THE END OF A CYLINDER SHAFT IN A PRINTING MACHINE

[75] Inventor: Hideaki Toyoda, Tokyo, Japan

[73] Assignee: Komori Printing Machinery Co., Ltd., Tokyo, Japan

[21] Appl. No.: 222,669

[22] Filed: Jan. 5, 1981

[51] Int. Cl.³ .............................................. F16H 55/12
[52] U.S. Cl. ...................................... 74/439; 474/903; 403/370; 403/371; 403/374
[58] Field of Search ................... 74/439, 434; 474/DIG. 903; 403/368, 370, 371, 374

[56] References Cited

U.S. PATENT DOCUMENTS

| 1,472,565 | 10/1923 | Manning | 403/371 |
|---|---|---|---|
| 2,269,821 | 1/1942 | Kemphert | 474/903 |
| 2,322,832 | 6/1943 | Davis | 474/903 |
| 2,632,334 | 3/1953 | Williams | 474/903 |
| 2,714,520 | 8/1955 | Krause | 474/903 |
| 2,811,376 | 10/1957 | Otto | 474/903 |
| 2,956,826 | 10/1960 | Nord | 403/368 |
| 3,656,785 | 4/1972 | Lothar | 403/371 |
| 3,696,685 | 10/1972 | Lampredi | 474/903 |
| 3,849,015 | 11/1974 | Peter | 403/368 |
| 4,140,413 | 2/1979 | Conrad | 474/903 |
| 4,338,036 | 7/1982 | DeLeu | 403/371 |

FOREIGN PATENT DOCUMENTS

| 51197 | 4/1922 | Fed. Rep. of Germany | 403/371 |
|---|---|---|---|
| 1057964 | 3/1959 | Fed. Rep. of Germany | 403/368 |
| 423318 | 1/1935 | United Kingdom | 474/903 |
| 820933 | 9/1059 | United Kingdom | 474/903 |
| 904551 | 8/1962 | United Kingdom | 403/371 |
| 1236308 | 6/1971 | United Kingdom | 403/368 |
| 2034861 | 6/1980 | United Kingdom | 403/371 |

OTHER PUBLICATIONS

"Oyo Kikai Kogaku" pp. 124–127, vol. 17, No. 6, 1976, K. K. Taiga Shuppan, Japan.

Primary Examiner—Leslie A. Braun
Assistant Examiner—D. Wright
Attorney, Agent, or Firm—Charles E. Pfund

[57] ABSTRACT

A structure for securing a cylinder drive gear to a cylinder shaft in a printing machine comprises a cylinder having an end shaft, a cylinder drive gear inserted and fixed by bolts onto said end shaft, a pair of taper rings with their taper faces being in contact with each other, one of said taper rings being mounted on said end shaft such that the movement in the axial direction is limited by said cylinder drive gear, another taper ring being mounted slideably on said end shaft, and a device for tightening said another taper ring toward said cylinder drive gear so that both taper rings expand in the radial direction.

4 Claims, 3 Drawing Figures

STRUCTURE FOR SECURING A CYLINDER DRIVE GEAR TO THE END OF A CYLINDER SHAFT IN A PRINTING MACHINE

BACKGROUND OF THE INVENTION

The present invention relates to the structure for securing a cylinder drive gear to the end of a cylinder shaft in the mechanism for driving a plate cylinder or the like of a printing machine or press.

A general rotary printing press has plate cylinders or blanket cylinders with their shafts supported by the frame at their both ends, and on at least one end of such shaft there is secured a cylinder drive gear which links the cylinder to the adjacent cylinders and also to the drive mechanism. Various structures are known for securing a cylinder drive gear to the end of a cylinder shaft. In a tyical example, the end of the shaft and the cylinder drive gear are tapered so that the shaft fits in the gear, and the drive gear on the tapered portion of the shaft is pressed toward the cylinder by tightening the nut on the thread which is cut on the end portion of the shaft, so that slip in the circumferential direction can be prevented by the friction and also by use of a key provided between them. In another example, the cylinder drive gear is secured to the end of the cylinder shaft with a key provided at the contact portion thereof so that slip in the circumferential direction is prevented, and also shift of the gear in the axial direction is limited by employment of a holding plate which is fixed to the end of the shaft by a bolt. These structures are disclosed in, for example, "Oyo Kikai Kogaku" Pages 124 to 127 Vol. 17, No. 6, 1976, published by K. K. Taiga Shuppan in Japan.

However, foregoing conventional structures for securing a cylinder drive gear to a cylinder shaft have the following disadvantages. In the first mentioned prior art structure, it is difficult to machine the tapered portion and keyway accurately, resulting in a high machining cost, and also it can reduce the strength of the shaft due to a cut for the keyway and also cause eccentricity of the drive gear. In the second mentioned structure, in addition to a high machining cost and reduction of the strength owing to the machining for the keyway, the drive gear is liable to vibrate due to a poor fitting accuracy between the drive gear and the shaft, resulting in a wear of the key and shaft that causes increased vibration. In order to avoid the vibration, the securing portion must be made long and the width of the frame which supports a long shaft cannot be made small.

As described above, conventional structures for securing a cylinder drive gear have such disadvantages that vibration of the gear and wear of the key and other components owing to the inertial torque when the machine stops cannot be avoided. These problems can cause failure of printing, and improvement of the mechanism has long been desired.

SUMMARY OF THE INVENTION

Accordingly, the primary object of the present invention is to provide the structure for securing a cylinder drive gear to the end of a cylinder shaft in a printing machine or press, so as to prevent failure of printing caused by the vibration of the drive gear.

In view of aforementioned situation, the present invention provides the structure for securing a cylinder drive gear to a cylinder shaft in a printing machine, wherein a cylinder drive gear is fitted and clamped by bolts, to the end portion of a cylinder shaft and a pair of taper rings are provided at the securing portion for fitting the drive gear to the circumferential surface of the end of the shaft by sliding one of the taper rings so that the drive gear is fitted to the end of the shaft through an increased contact area, whereby failure of printing due to the vibration of the drive gear can be prevented.

DESCRIPTION OF THE PREFERRED EMBODIMENT

Figure 1:
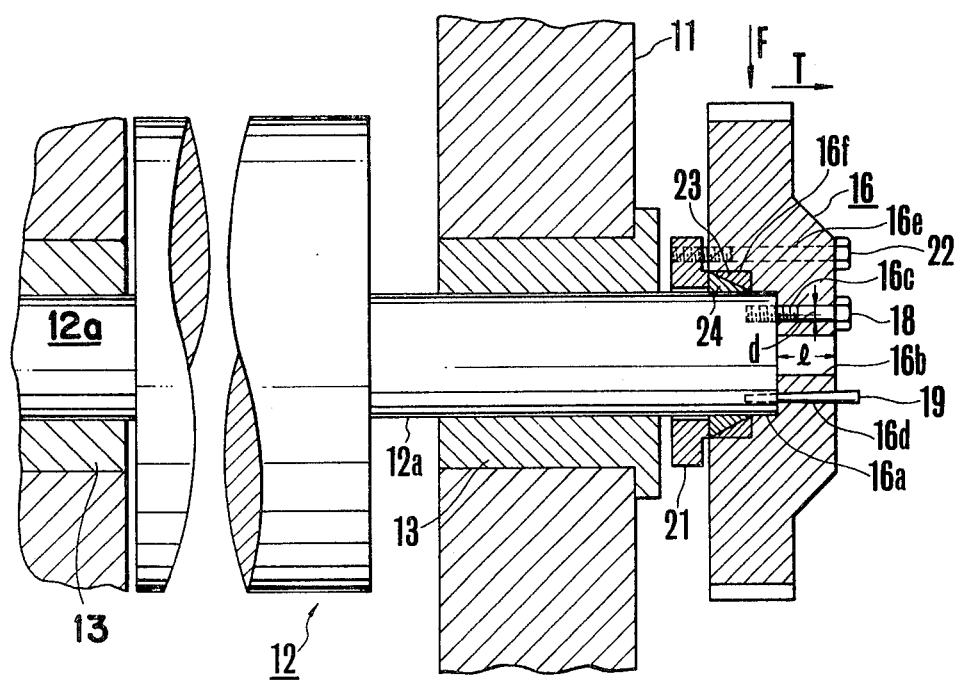
FIG. 1 is a cross-sectional view showing the structure according to the present invention for securing a cylinder drive gear to a cylinder shaft in a printing press.
Figure 2:
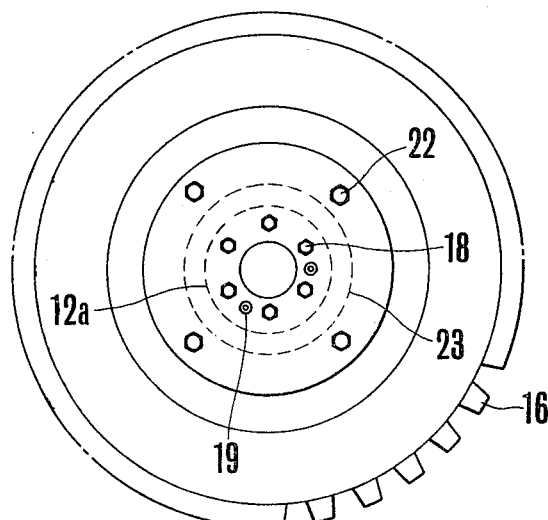
FIGS. 2 and 3 are a front view and cross-sectional view in part of the structure shown in FIG. 1, respectively.
Figure 3:
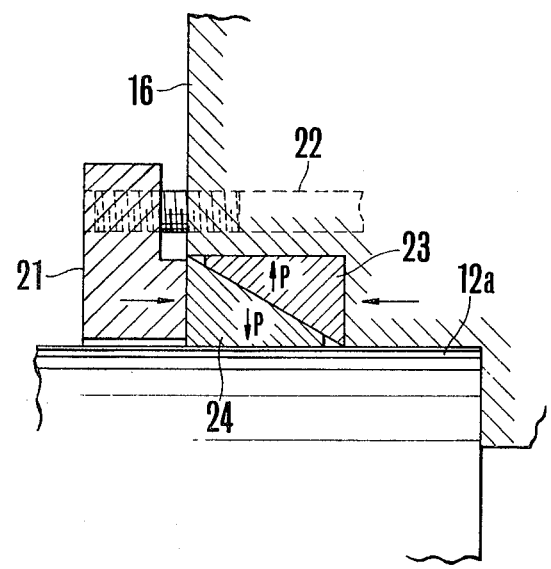

FIGS. 1-3 show the structure for securing a cylinder drive gear to a cylinder shaft embodying the present invention, in which an end shaft 12a of the cylinder 12 is supported rotatably by a frame 11 through a bearing 13. Although the structure of only one side of the cylinder 12 is shown, the other side of the cylinder is also provided with an end shaft supported identically by the frame through a bearing. The bearing is of a known type and it is illustrated briefly. In general, a unitary material. A cylinder drive gear 16 has a shaft hole having a large diameter section 16a and a small diameter section 16b, and it is secured to the end shaft 12a such that the large diameter section 16a fits to the end portion of the end shaft 12a. The drive gear 16 also has a plurality of through-holes 16c, 16d and 16e provided in respective equal intervals around the shaft hole. A plurality of bolts 18 are screwed from outside to the end face of the end shaft 12a through-holes 16c so that the drive gear 16 is coupled to the end of the shaft, and a plurality of taper pins 19 are pegged into the end face of the shaft through the holes 16d so as to prevent a slip between the drive gear 16 and the end shaft 12a in the circumferential direction. Between the drive gear 16 and the bearing 13 on the end shaft 12a, there is provided a pressing flange 21 formed in a disk shape slidable on the end shaft 12a, and it is pulled toward the drive gear 16 by screwing a plurality of clamp bolts 22 provided on it from outside through the holes 16e of the gear 16.

The large diameter section 16a of the shaft hole in drive gear 16 is cut away at the side of pressing flange 21 to form an annular cut portion 16f, in which a pair of taper rings 23 and 24 mounted on the end shaft 12a are fitted. The taper rings 23 and 24 are formed to have a triangular cross-section, so that their machined taper faces are in contact with each other. One taper ring 23 is fitted to the cut portion 16f of the drive gear 16 and another taper ring 24 is slideably mounted on the end shaft 12a. The taper ring 24 is slideably shifted against the end face of slideable pressing ring 23 toward the end of the shaft, and it is deformed contractively by the action of its taper face so as to fit to the end shaft 12a, while the other taper ring 23 is slightly deformed expansively so as to fit to the drive gear 16.

In mounting the drive gear 16 on the end shaft 12a of cylinder 12, taper rings 23 and 24 are first inserted into the cut portion of the drive gear, then the pressing ring 21 is mounted on the drive gear 16 by screwing the bolts 22 so that the taper rings 23 and 24 do not come out of the drive gear 16. The drive gear assembly is inserted onto the end portion of the end shaft 12a, the taper pins 19 are pegged for positioning, and the bolts 18 are screwed into the end face of end shaft 12a. Thus, cylinder drive gear 16 is fitted to the end face of the end shaft 12a.

After that, as the clamp bolts 22 are further screwed into the pressing ring 21, it is pulled toward the drive gear 16. Then, taper ring 24 is pushed by the pressing ring 21 toward the end of the shaft, causing expansive deformation of both taper rings 23 and 24 in the radial direction by the action of the taper faces, whereby the drive gear 16 and the end shaft 12a are pressed in the directions shown by arrow P in FIG. 3. Consequently, the cylinder drive gear 16 is tightly secured to the end shaft 12a with the taper rings 23 and 24 placed therebetween. The taper rings 23 and 24 are preferably arranged with their taper faces being oriented as shown in the drawings. The result of experiments shows that the strongest coupling between the end shaft 12a and the drive gear 16 is obtained by choosing the bolts 18 so that ratio l/d where l is the through-length of the bolt 18 in drive gear 16 and d is the diameter of the bolt 18, is between 2.5 and 3.

Since a helical gear is generally used for drive gear 16, a radial force is applied to the drive gear as shown by arrow F in FIG. 1. Therefore, these taper rings 23 and 24 are preferably provided with their axial dimension being inclusive within the annular cut portion in the drive gear, so as to enhance the strength of coupling against the radial force. A thrust force is also applied to drive gear 16 as shown by arrow T in FIG. 1. However, this structure is very strong against the external thrust force, because drive gear 16 is in press contact with the end shaft 12 at both its end face and circumferential surface.

As can be seen from the above description, the present invention provides the structure for securing a cylinder drive gear to the end portion of a cylinder shaft in a rotary printing press and the like, wherein the drive gear is inserted and screwed by bolts onto the end portion of the shaft, and a pair of taper rings are mounted on the shaft, one being fixed to the securing section of the gear and the other being mounted on the shaft slideably, so that the drive gear is press-fitted to the shaft at the end face of the shaft and also at the circumferential surface of the shaft. A large contact area at the end face and circumferential surface of the shaft allows the drive gear to be secured tightly to the end of the cylinder shaft, and coupling is not loosened by the vibration and shock at stopping of the machine or by the external force through the drive gear. Consequently, the drive torque can be transmitted efficiently, and the shaft and the shaft hole in the drive gear are prevented from wearing which could cause the vibration and eccentricity of the gear, thus every failure of printing can be prevented. Elimination of a key solves expensive machining cost, reduction of the strength of the shaft and eccentricity of the drive gear, and also facilitates mounting and demounting of the drive gear. Moreover, the circumferential surface of the shaft is effectively utilized for securing the drive gear, so that a large contact area can be obtained without elongating the shaft, whereby the end portion of the cylinder shaft can be made compact.

The present invention is not limited to the foregoing embodiment, but extensive applications and various modifications are possible.

What is claimed is:

1. In a printing press, a plate cylinder, a supporting frame comprising spaced, supporting frame members, bearing members supported on the frame in alignment, shafts at the opposite ends of the plate cylinder rotatably journaled in said bearings, one at least of said shafts at one end extending through its bearing such that its end is outboard of the frame at that side, a drive gear having an integral hub portion of greater thickness than the width of the drive gear, said hub portion containing in the side facing the frame member a cylindrical recess extending partway through, said cylindrical recess corresponding in inside diameter to the outside diameter of the shaft and means for securing the drive gear to the outboard end of the shaft comprising, in combination, telescoping concentric inner and outer rings of opposite triangular cross section positioned within said cylindrical recess about the shaft, the outer ring having an outer cylindrical surface in contact with the inner surface of the cylinder recess and the inner ring having an inner cylindrical surface in contact with the exterior surface of the shaft and said rings having an axial thickness slightly less than the depth of the recess, a clamp ring having an outside diameter larger than the diameter of the shaft positioned about the shaft between the gear and the frame member, said clamp ring having an annular shoulder protruding from the side facing the gear of such radial width as to have contact exclusively with the inner one of the telescoping rings and radially outward thereof a plurality of peripherally-spaced threaded holes and said hub of the gear containing corresponding peripherally-spaced holes and bolts in the holes in the hub of the gear threaded into holes in the clamp ring holding the protrusion thereon in clamping engagement with the inner one of the telescoping rings such as to expand the outer one of the telescoping rings against the inner surface of the recess and to contract the inner one of the telescoping rings against the surface of the shaft.

2. A printing press according to claim 1 wherein the hub of the gear contains a plurality of bolt holes positioned about its geometric center at a radius from the center less than the diameter of the recess and wherein bolts are threaded into the end of the shaft within the recess through said bolt holes.

3. A printing press according to claim 1 wherein there are peripherally-spaced, tapered holes in the hub at the same radius from the center thereof as the bolt holes entering the recess located between adjacent bolt holes entering the recess and tapered pins driven through said tapered holes into the end of the shaft.

4. A printing press according to claim 2 wherein there are peripherally-spaced, tapered holes in the hub at the same radius from the center thereof as the bolt holes entering the recess and located between adjacent holes entering the recess and tapered pins driven through said tapered holes into the ends of the shaft.

* * * * *